(12) United States Patent
Kuhlow et al.

(10) Patent No.: US 8,009,085 B2
(45) Date of Patent: Aug. 30, 2011

(54) LEVEL GAUGE WITH POSITIVE LEVEL VERIFIER

(75) Inventors: Kyle Rolf Walter Kuhlow, Deer Park, TX (US); Craig Lee Longcor, League City, TX (US)

(73) Assignee: GK Tech Star LLC, Deer Park, TX (US)

( * ) Notice: Subject to any disclaimer, the term of this patent is extended or adjusted under 35 U.S.C. 154(b) by 0 days.

(21) Appl. No.: 12/372,485

(22) Filed: Feb. 17, 2009

(65) Prior Publication Data

US 2010/0207807 A1 Aug. 19, 2010

(51) Int. Cl.
*G01S 7/40* (2006.01)
*G01S 13/08* (2006.01)
*G01F 23/284* (2006.01)

(52) U.S. Cl. ........ 342/173; 342/118; 342/124; 342/165; 342/175; 73/290 R; 324/600; 324/629; 324/637

(58) Field of Classification Search ............. 342/5–11, 342/118, 124, 165–175, 195; 73/290 R, 73/304 R, 304 C, 305–308; 324/600, 629, 324/637–646; 367/13
See application file for complete search history.

(56) References Cited

U.S. PATENT DOCUMENTS

| | | | | |
|---|---|---|---|---|
| 4,044,355 A | * | 8/1977 | Edvardsson | 342/124 |
| 4,219,814 A | * | 8/1980 | Johnson | 342/5 |
| 4,665,403 A | * | 5/1987 | Edvardsson | 342/124 |
| 5,053,775 A | * | 10/1991 | Mawhinney et al. | 342/124 |
| 5,119,676 A | | 6/1992 | Bower et al. | |
| 5,568,449 A | | 10/1996 | Rountree et al. | |
| 5,689,265 A | | 11/1997 | Otto et al. | |
| 6,538,598 B1 | | 3/2003 | Wilkie et al. | |
| 6,795,015 B2 | * | 9/2004 | Edvardsson | 342/124 |
| 6,828,930 B2 | * | 12/2004 | Hagg | 342/124 |
| 7,088,285 B2 | * | 8/2006 | Smith | 342/124 |
| 7,345,622 B2 | | 3/2008 | Edvardsson | |
| 7,417,919 B2 | * | 8/2008 | Jones | 367/13 |
| 7,486,226 B2 | * | 2/2009 | Edvardsson | 342/118 |
| 7,525,476 B1 | * | 4/2009 | Delin et al. | 342/124 |
| 2004/0145510 A1 | * | 7/2004 | Edvardsson | 342/5 |
| 2005/0264440 A1 | * | 12/2005 | Smith | 342/124 |
| 2008/0062037 A1 | * | 3/2008 | Edvardsson | 342/124 |
| 2008/0098817 A1 | | 5/2008 | Jones | |

OTHER PUBLICATIONS

Ohmart/Vega Corporation, Pulse Radar for Level Measurement Vegapuls, Vegapuls 60 Series, Brochure No. 31424-US, Sep. 2, 2006.
European Patent Office, International Search Report and Written Opinion in related application No. PCT/US2010/024432 Jul. 26, 2010.

* cited by examiner

*Primary Examiner* — Bernarr Gregory
(74) *Attorney, Agent, or Firm* — Wood, Herron & Evans, LLP

(57) ABSTRACT

A level verification system for a radar level gauge utilizes a remotely positionable target. The target is positioned inside of a tank that is subject to level measurement, and stowed at a first position and selectively positionable to a second position to reflect emitted electromagnetic radiation in an amount indicative of a predetermined material level. The verification system can verify a high level alarm will be triggered when the material reaches a high level corresponding to the level of the target, by remotely positioning the target in front of the emitter of the radar gauge. The target reflects electromagnetic energy to the detector at approximately the same intensity that the material reaching the high level would reflect so as to provide an accurate verification.

12 Claims, 7 Drawing Sheets

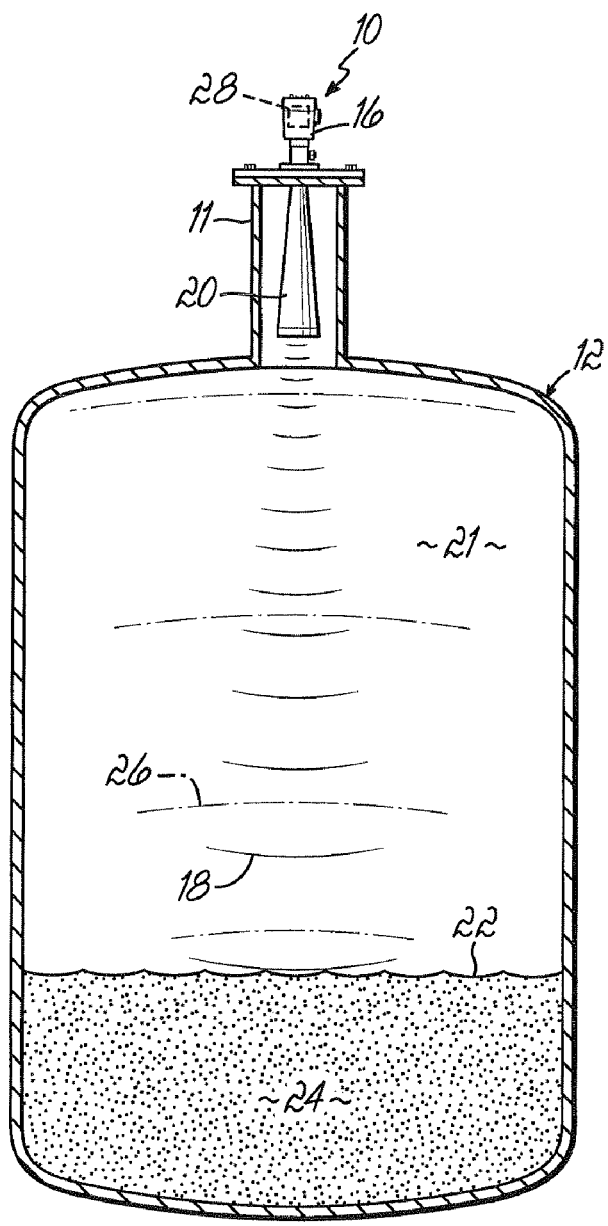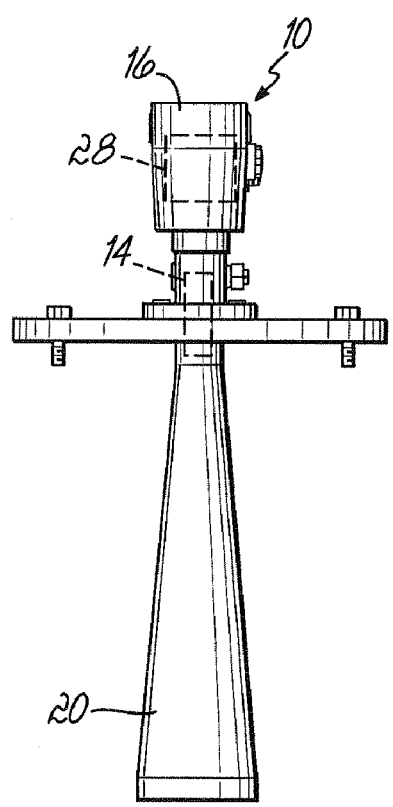
PRIOR ART
FIG. 1
PRIOR ART
FIG. 1A

LEVEL GAUGE WITH POSITIVE LEVEL VERIFIER

FIELD OF THE INVENTION

The field of the invention is level gauge systems, in particular radar level gauge systems.

BACKGROUND OF THE INVENTION

In many environments, various materials are stored or processed in tanks. These materials include foods, beverages, pharmaceuticals and fuels. Non-contact level sensing gauges are used for such environments. There are several types. Examples include those that use radar transmitters, or ultrasonic waves. A high degree of accuracy has been achieved by the use of level-sensing gauges which monitor content levels by transmitting microwave pulses from an antenna toward the surface of the tank contents. These pulses are reflected from the contents and back to the antenna. Other radar gauges use a frequency modulated continuous wave rather than pulses.

Radar signals are largely unaffected by noise, by air turbulence, or by fluctuations in dielectric constant above a nominal minimum value, density, or conductivity. Even liquids having agitated surfaces or gas bubbles can be reliably measured. Radar sensors are suitable for liquids, solids, powders, granules, dust, corrosive steam and vapors, regardless of the media characteristics, pressures, and temperatures. An example of a radar device 10 mounted on a nozzle flange 11 of a tank 12 is shown in prior art FIGS. 1 and 1A. Inside the device is an antenna 14 at the base of a housing 16 that emits an electromagnetic signal in the form of a microwave 18 which travels through a wave guide 20 and a vapor space 21 toward the surface 22 of a material 24 being measured. When the signal reaches the surface of the material a reflected wave 26 returns in the direction of the antenna. The antenna receives this reflected wave and the electronics 28 in the housing process the information provided by the emitting of waves and the return of waves in a variety of ways, to determine the level of the material in the tank. FIGS. 1 and 1A illustrate one example of a radar device 10. The appearance, materials, and features of the radar system, especially the waveguide 20, vary with the material 24 being measured.

Operators of facilities using tanks need to not only know the levels on a routine basis, but they also need to set safety limits and be alerted during abnormal conditions that bring the level too high. Typically, if a safety limit set at approximately 95% of tank capacity is reached, alarms and other actions result. Facilities having good safety protocols test the system to verify that it will work when needed. Various ways to accomplish this testing have been employed, ranging from electronic measures to raising the level with actual product. Both of these methods have drawbacks. The electronic test which only manipulates the software, does not ensure that the system will function properly since it does not test the measurement device, but rather forces the software to a desired state. Software manipulations are unacceptable to most Safety Integrated Systems checks. Physically moving product is costly and must be closely monitored because if the safety system fails the customer may overfill the tank and cause a recordable incident. Other testing methods involve opening the tank or removing the device. These methods are time-consuming. In many cases the process must be shut-down to safely open the tank or remove the device. This results in lost production and is extremely costly. Therefore there is the need for a device that allows an easy and repeatable method of testing to verify that the safety system will be triggered if the material reaches the safety limit. It is desired that this be "real-world" proof that is easily understood by those implementing the safety checks.

SUMMARY OF THE INVENTION

In one aspect a level verification system comprises a radar level gauge emitting electromagnetic radiation towards a material in a tank, and receiving reflected electromagnetic radiation indicative of the level of material in the tank, with a remotely positionable target inside the tank that is stowed at a first position and selectively positionable to a second position to reflect emitted electromagnetic radiation an amount indicative of a predetermined material level.

Another aspect is a method of verifying that a high level alarm based on electromagnetic energy reflected from a material in a tank is triggered when the material reaches a high level corresponding to the high level alarm. The method determines a level of the material in the tank by emitting electromagnetic energy towards a surface of the material and measuring the reflected electromagnetic energy received at a detector. A target is provided that may be remotely positioned between the emitter of the electromagnetic energy and the material so that the target reflects electromagnetic energy to the detector at approximately the same intensity that the material reaching the high level would reflect.

A third aspect is a safety level limit verifier for verifying a safety limit in a tank comprising a movable rod having a proximal end outside the tank and a distal end inside the tank. A target adapted to reflect electromagnetic waves is coupled to the distal end and a mountplate holds a radar level gage and a coupling sized to seal with the movable rod and to allow the movable rod to do at least one of rotating or sliding.

The above and other objects and advantages of the present invention will be made apparent from the accompanying drawings and the description thereof.

BRIEF DESCRIPTION OF THE DRAWINGS

Prior art FIG. 1 is a cross-sectional schematic view of a radar level gauge installed in the nozzle of a tank.

Prior art FIG. 1A is a schematic view of the radar level gauge of FIG. 1.

DETAILED DESCRIPTION OF THE INVENTION

Figure 2:
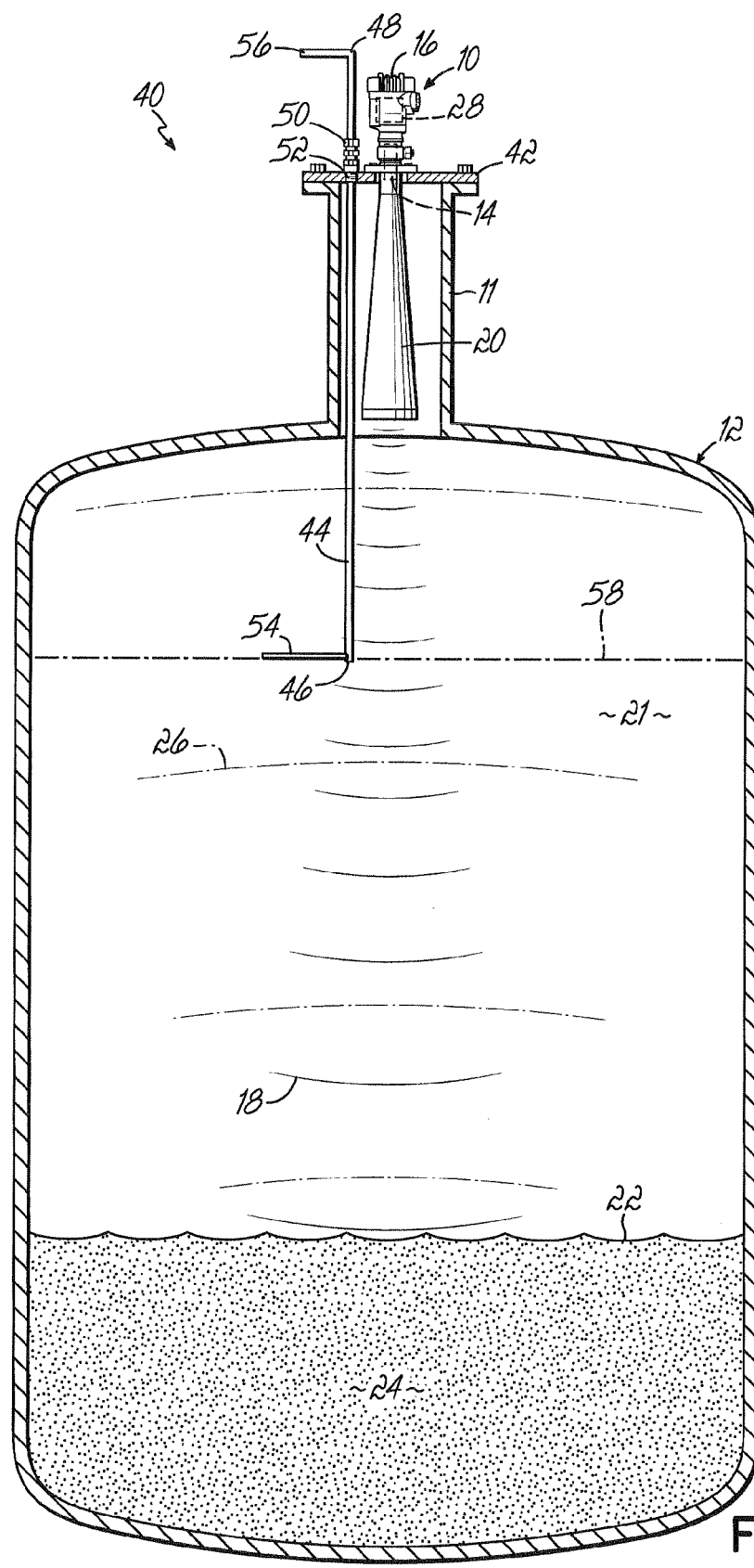
FIG. 2 is a cross-sectional schematic view illustrating a first embodiment of a level verification system in its stowed position.

With reference to FIG. 2, a first embodiment of a level verification system 40 is illustrated. The level verification system comprises the radar level gauge 10, a mount plate 42, and a moveable arm 44 having a distal end 46 and a proximal end 48. The movable arm passes through a coupling 50 located in an aperture 52 of the mount plate. A reflective target piece 54 is at the distal end and an indicator 56 at the proximal end. The movable arm may be rotated within the coupling by grabbing the indicator piece, which is strong enough to be a handle. In other embodiments the indicator may be a system other than a handle, such as a dial, or an electronic readout. In some embodiments the movable arm may be extended or retracted in the coupling, moving the target piece closer to or further from the radar level gauge 10. In still other embodiments the movable arm may not be an arm at all, but may be any mechanical or other linkage that can move the target piece between at least two desired positions. The coupling should seal around the movable arm, especially in applications that have a pressurized tank or harmful vapors.

Also illustrated in FIG. 2 is a horizontal line representing a customer safety limit, 58.

As seen in FIG. 2 the waveguide often takes up nearly the full diameter of the nozzle interior. This will be of significance during later descriptions.

Turning attention now to the material, as is well known in the art, different materials have different dielectric constants. Dielectric constant is abbreviated dK, and ranges from approximately 1.5 to 80. Some materials, such as water, have a high dK and reflect a relatively large percentage of a microwave 18 in the form of a reflected microwave 26 from surface 22. Other materials, such as hydrocarbons that have a low dK, reflect a much smaller percentage, absorbing and attenuating a relatively larger portion of the microwaves 18. Thus, at a given height, for example the height of the customer safety limit 58, some materials reflect a strong signal while others reflect a weak signal. A radar level gauge properly calibrated for the material in the tank will detect the reflected microwaves and output a signal indicative of the material height. This information is used for routine operations. It is also used for triggering safety interlocks should the material ever rise to the height of the safety limit. Measurement and safety systems such as these are used with both liquid and solid materials. An example of a solid is grain in a grain silo.

An object of the current invention is producing, upon demand, a reflected microwave 26 that is approximately equivalent in magnitude or intensity to a reflected microwave 26 that would be produced by the specific material reaching the safety limit. There are several difficulties in doing so. The embodiments of the current invention address these difficulties, to provide a reliable and simple system and method for verifying that the safety protocols would be triggered should the material reach the safety limit.

Figure 3:
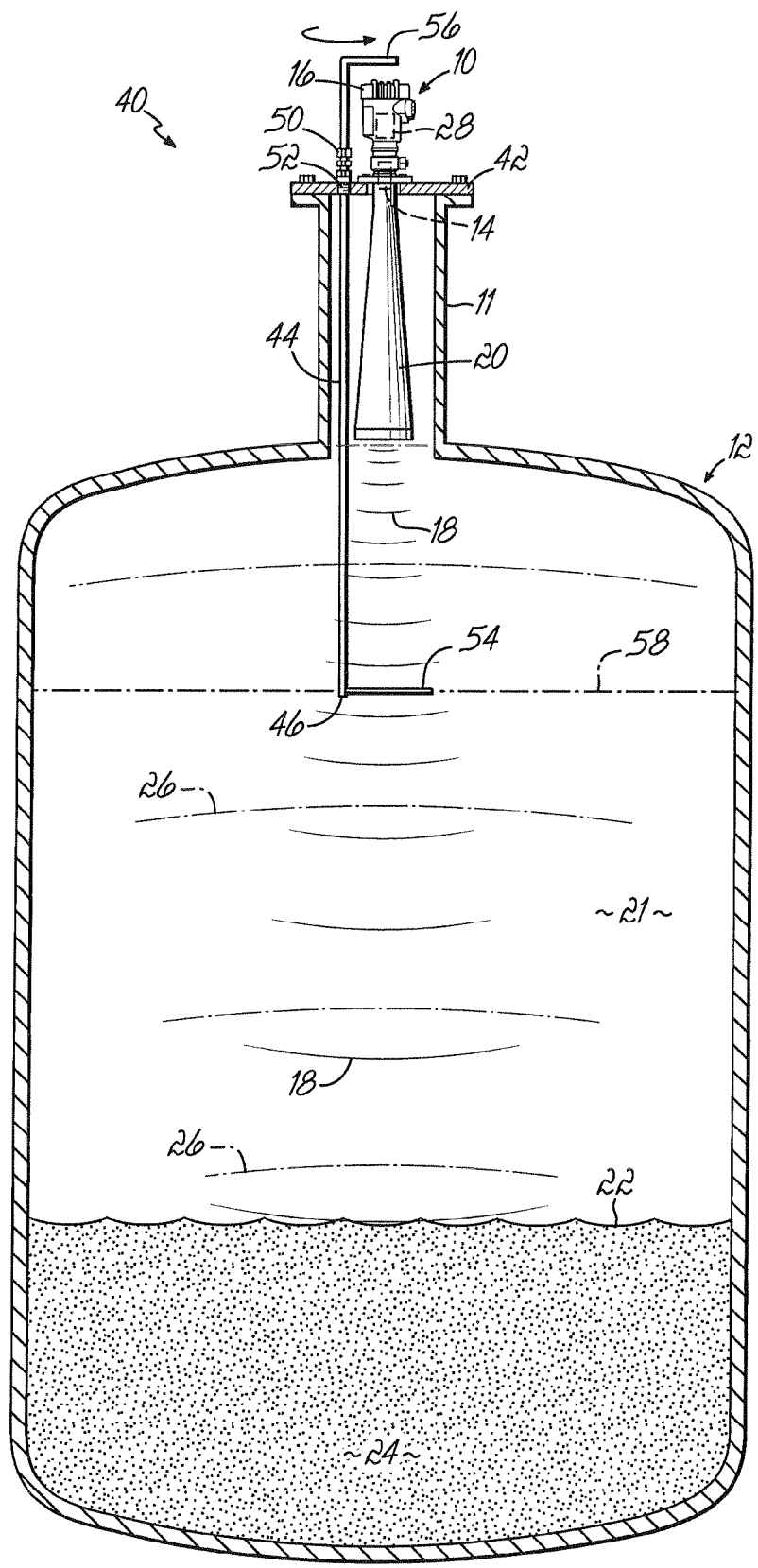
FIG. 3 is a cross-sectional schematic view illustrating the embodiment of FIG. 2 in its deployed position.
Figure 9A:
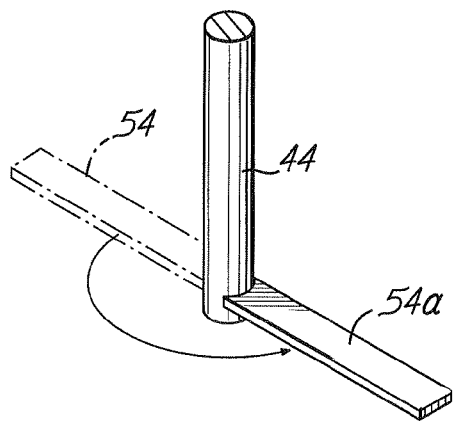
Figure 9B:
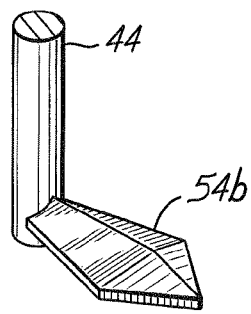
Figure 9C:
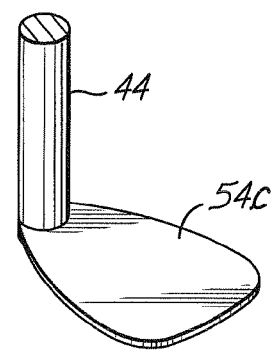
Figure 9D:
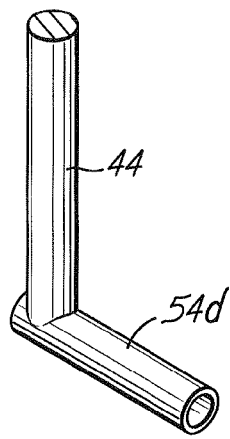

In FIGS. 2 and 3, the target piece is located at the same level as the customer safety limit. This configuration represents one embodiment of the system 40. Because the target piece is located in a wide-open region of the tank, it may be made in a variety of shapes. It may be large or small, the object being to reflect microwaves at the same magnitude as would be reflected by the material at the height of the safety limit 58. Examples of targets 54A, 54B, 54C, and 54D, are shown in FIGS. 9A-9D. These are merely examples, and are not meant to be limiting. Further, in other embodiments, by way of example, the target may be made convex, concave, textured, and with or without holes. For example, for materials that have a low dK, a metal reflective target piece 54B that is slanted may be used, to ensure that most of the measuring energy will not be reflected back to the radar unit. For a high dK material, the target piece may be large (FIG. 9C), with enough surface area to send back a larger amount of energy. FIG. 9D illustrates a version made of cylindrical or pipe stock, that is available in various metals and plastics.

In FIG. 2, the target piece 54 and the indicator 56 are to the left at a first position, and are not in the path of the microwaves 18. In FIG. 3 the movable arm has been rotated bringing the target piece and the indicator to the right to a second position. This blocks the path of a portion of the microwaves 18 substantially preventing them from reaching the surface of the material, and reflecting them back to the radar level gauge. This is accomplished without any access into the tank, and without disruption to the manufacturing process. It is done in an area where the tank geometry is spacious so it does not limit the size and shape of the target piece. A person rotating the handle is unable to see the position of the target, and relies on the indicator to know its position. Locking systems may also be provided, so that the target 54 is not inadvertently moved. Hard stops may be located on the outside of the tank to stop movement at the fully deployed and fully stowed positions rather than relying on a person to rotate to a correct position.

Tanks using radar level gauges are often quite large, on the order of hundreds of feet, making the moveable arm of FIGS. 2 and 3 very long relative to its diameter. It is difficult to position a target at a precise orientation and angle when it is at the end of a long arm, because any bow in the arm, or any non-parallelism between the arm and the radar signal, may result in errors. Further, tanks are often subject to changing pressure and heat that cause misalignment. A target set in the tank may be subjected to actual contact with product, damaging it. For at least this reason, it is desirable to shorten the moveable arm.

Figure 4:
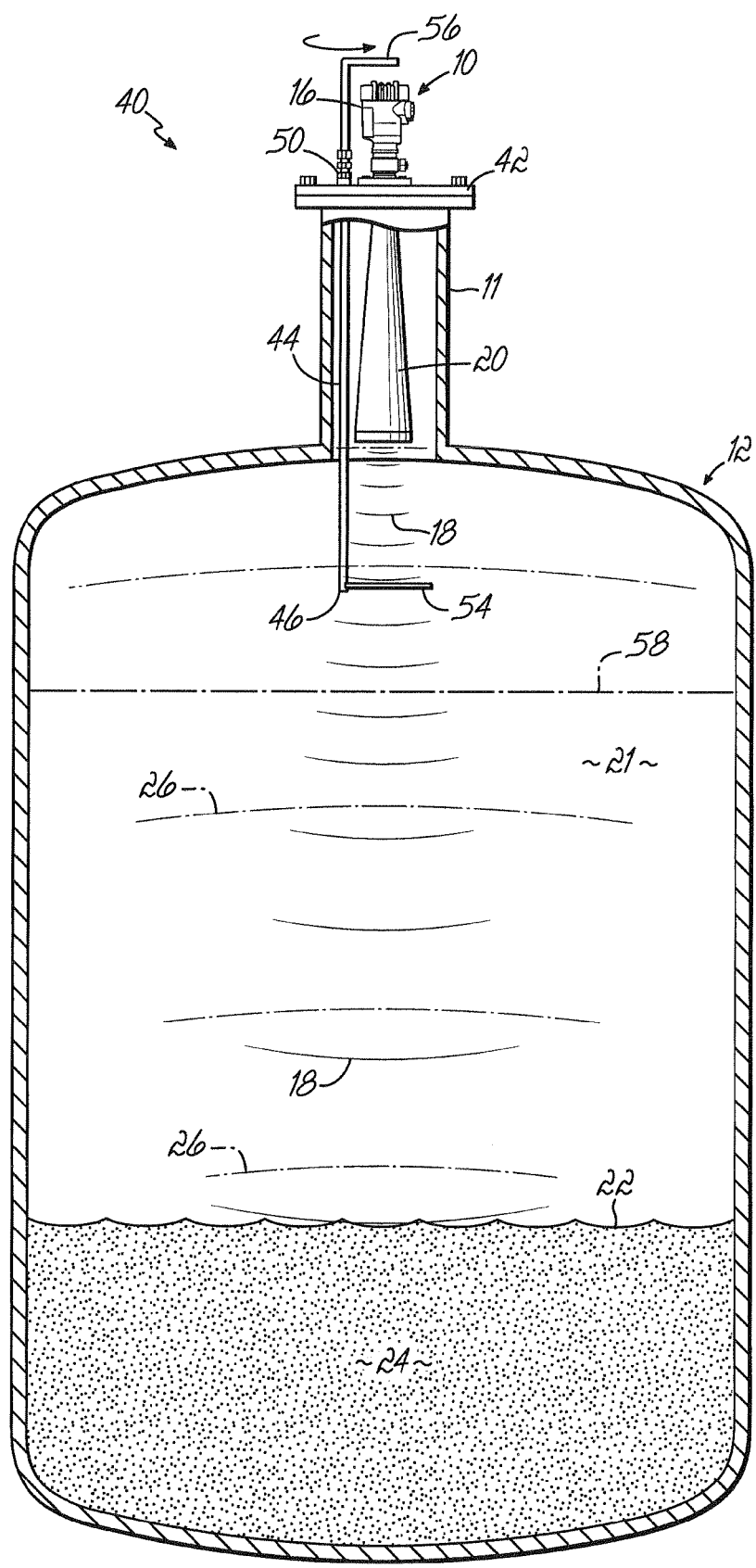
FIG. 4 is a cross-sectional schematic view illustrating a second embodiment of a level verification system.

FIG. 4 illustrates a second embodiment of a system 40 with a shortened arm. The target is still in a spacious tank area and able to be sized as large as needed. Typically, because it is closer to the radar level gauge, the target of FIG. 4 would be smaller than a target of FIG. 3, for a given material and safety limit. Or it can be changed in other ways to produce the same signal as a target positioned at the safety limit 58 as in FIG. 3.

Figure 5:
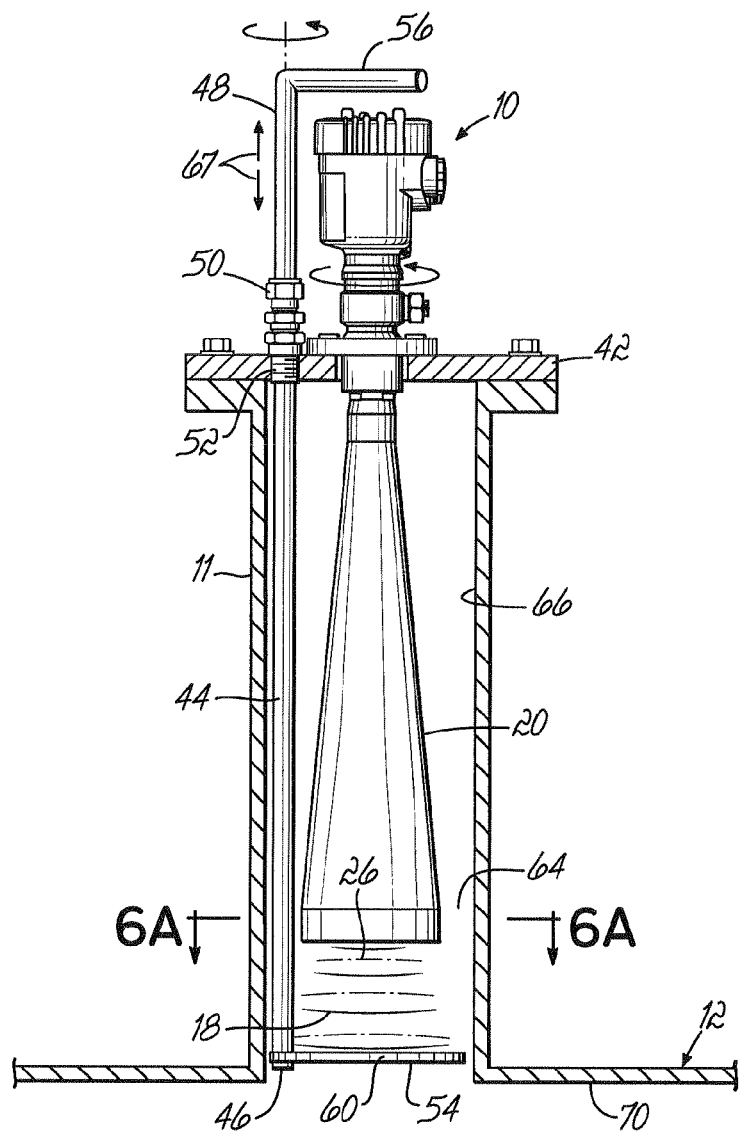
FIG. 5 is a cross-sectional schematic view illustrating a third embodiment of a level verification system.
Figure 6A:
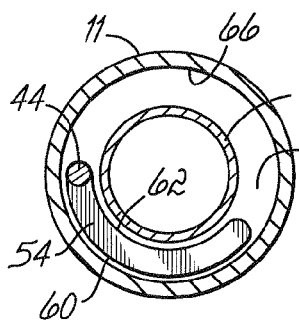
FIGS. 6A-6C are detailed views as indicated by the section 6A in FIG. 5. In some, item 20 is drawn in phantom lines for clarity.

A third embodiment is illustrated in FIGS. 5, 6A-6C and 8. The moving arm is shortened so the target piece rests inside the nozzle. The target has an outside arc edge 60 and an inside arc edge 62 that allow the target to fit in an annulus area 64 defined by the wave guide 20 and inside wall 66 of the nozzle when the target is in its stowed position as shown in FIG. 6A. An advantage of the size and shape shown in FIG. 6A is that the target may be pulled further up towards the mount plate as indicated by arrows 67. This allows out-of-the-way storage, with additional protection as compared to below (FIG. 5) the wave guide. However, if the pulling-up is not desired, the target may be larger and not have a uniform inside arc edge 62 as long as it does not interfere with the microwaves in an amount that interferes with the clear identification of material levels when in the stowed position. For any target, the moveable arm 44 may be used to move the target further away from the radar level sensor during the actual verification step, if that is where the reflectance equivalent to the safety limit is found. The verification need not take place inside the nozzle.

Figure 6B:
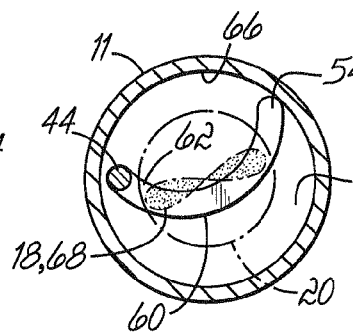
Figure 6C:
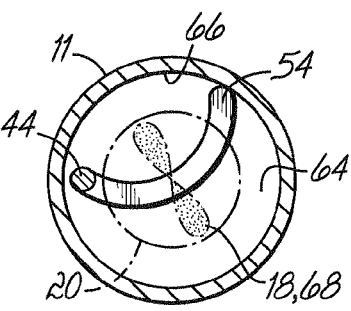

Such a slender target 54 may seem ill suited for blocking a substantial amount of a microwave, but that is not so when the shape of the microwave signal is taken into account. In FIG. 6B the butterfly shape 68 of the microwave signal 18 is shown. The radar level gauge is installed in the mount plate with an angular orientation relative to the aperture 52 so that when the target is rotated into position (FIG. 6B) a large portion of the microwave signal is blocked, and therefore reflected back to the radar level gauge. FIG. 6B is an example of the device in use for a relatively large dielectric material. In FIG. 6C, the radar level gauge has been rotated approximately 90 degrees from its position in 6B, moving the orientation of butterfly shape 68. In FIG. 6C, deployed target 54 blocks only a small portion of radar signal 18, near its center. FIG. 6C is an example of the device in use for a relatively small dielectric material. Thus, with the embodiment of FIG. 5, a technician rotating the radar level gauge 10 on the mount plate 42 can change the amount of cross-sectional signal the slender arc-shaped target 54 reflects. A change in the design of the target is not necessary to accommodate a wide variety of materials and safety limits as a tank is put to new uses, or as a radar level gauge with a level verification system is moved to another tank. It is only necessary to rotate the radar level gauge relative to the mount plate during set-up. This is another advantage of the slender target 54 of FIG. 8.

Thus, the embodiment of FIG. 5 illustrates a compact radar level gauge with level verification that is not significantly larger than one without level verification. The mount plate and coupling may remain associated with the radar level gauge and be easily stored and shipped as a unit.

Alternatively, the movable shaft 44, target 54, indicator 56, and coupling 50 may be added to an existing radar level gauge by modifying the mount plate 42 to receive the coupling.

Figure 7:
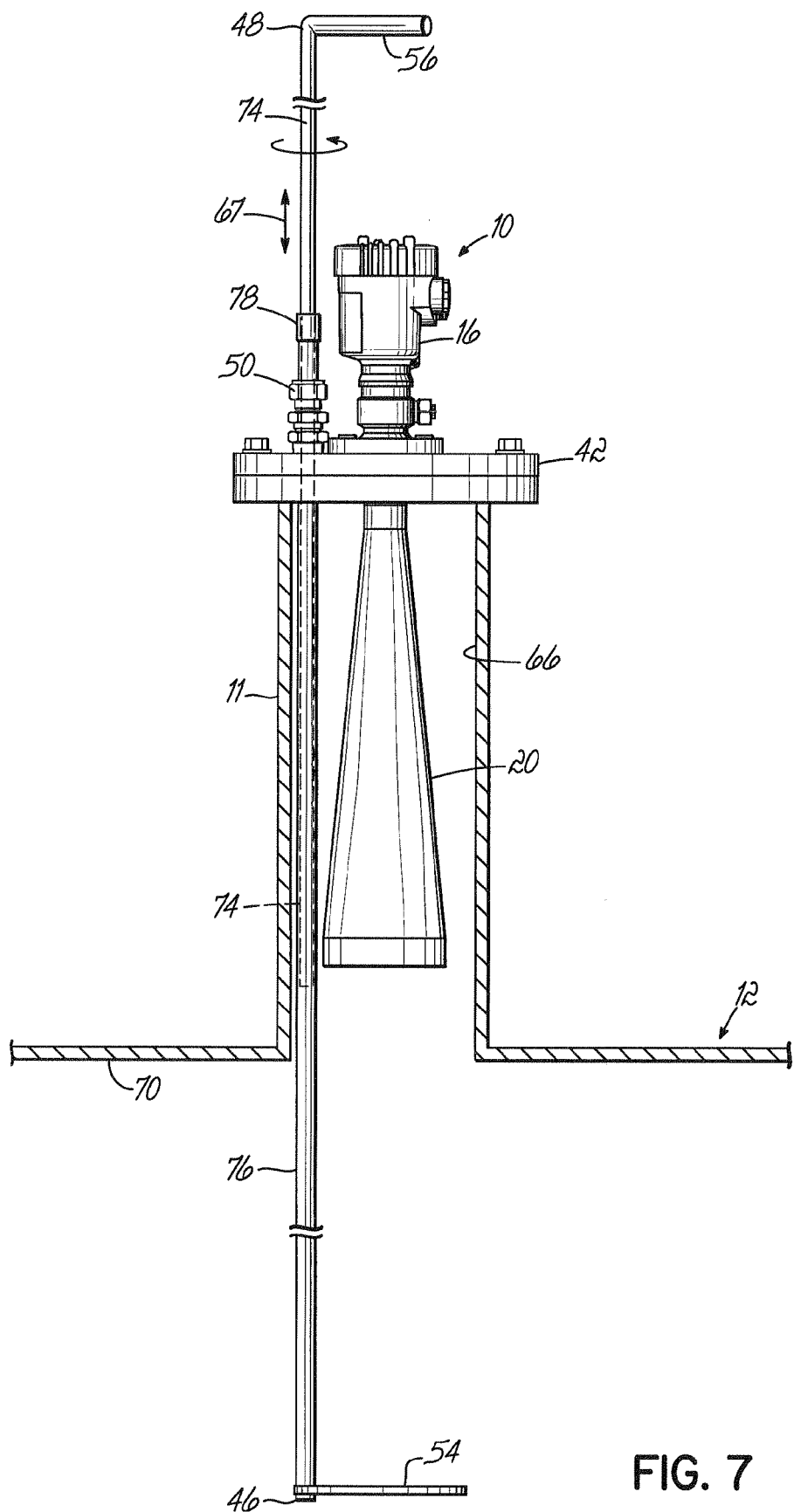
FIG. 7 is a cross-sectional schematic view illustrating a fourth embodiment of a level verification system.
Figure 8:
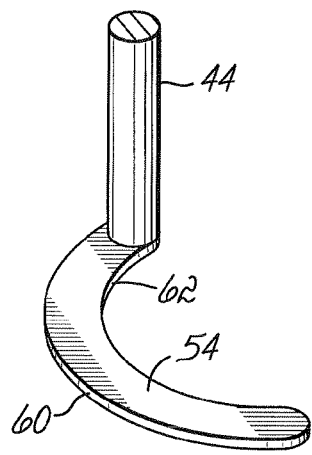
FIGS. 8 and 9A-9D are detail views of reflective targets used in the preceding embodiments.

FIG. 7 is an embodiment similar to FIGS. 2 and 3, but with the following difference. Although a large target that is constantly at the end of a long moveable rod has the aforementioned problems with damage due to contact with the material, one solution is to have the rod axially movable through the coupling as indicated by the arrows 67. The target may be lowered and rotated into position as in FIG. 3, but may be raised as high as possible and rotated out of position under an upper tank wall 70 to protect it during routine operation. Raising the target requires head room above the tank. Head room could be a problem, for example, if a 100 foot tank were inside a 105 foot building. Therefore an embodiment having a telescoping or segmented movable arm so that the target may have a large range of axial travel without the need for a great amount of head room is illustrated in FIG. 7. An upper portion 74 slides into a lower hollow portion 76, and they are secured together by a collet 78. Graduations, or a pin and hole configuration (not shown) may be used on the upper portion 74 and lower portion 76 to make certain that intended lengths are achieved. This is just one configuration for achieving large travel with reduced exterior length. Other movable arms, by way of example, may include removable or hinged segments, or other configurations obvious to one of ordinary skill in the art.

Although the described embodiments have focused on a movable rod that is located closely to a radar level gauge, any system for remotely putting a target piece that produces a reflectance equivalent to the reflectance of the material at the safety limit or another selected level, would meet the intent of the current invention. Systems for doing so may include, but not be limited to, electric, pneumatic, and hydraulic. However, the simple nature of the described and illustrated embodiments provide a "real-world" verification that is easy for technicians to understand and inexpensive to manufacture and maintain.

What is claimed is:

1. A verification system for producing upon demand a reflected electromagnetic radiation signal indicative of a predetermined material level comprising:
   a radar level gauge emitting electromagnetic radiation towards a material in a tank, and receiving reflected electromagnetic radiation indicative of the level of material;
   a mount to support the radar level gauge;
   a movable shaft passing through the mount; and
   a remotely positionable target inside the tank coupled to the movable shaft, that is stowed at a first position and selectively positionable to a second position to reflect emitted electromagnetic radiation at approximately the same intensity that material reaching the predetermined material level would reflect.

2. The verification system of claim 1 wherein:
   the mountplate is adapted to mount to a nozzle flange on the tank; and
   the remotely positionable target is adapted to not substantially reflect the emitted electromagnetic radiation when the first position is inside a nozzle below the nozzle flange.

3. The verification system of claim 2 wherein the remotely positionable target has an exterior profile that fits closely adjacent an inside wall of the nozzle, and an interior profile that fits outside the path of the emitted electromagnetic radiation when the remotely positionable target is in the first position.

4. The verification system of claim 3 wherein the exterior profile and the interior profile are substantially in the shape of concentric arcs.

5. The verification system of claim 4 wherein the radar level gauge angular orientation relative to the moveable shaft is adjustable to change the intersection of the target with the path of the emitted electromagnetic radiation.

6. A level detector with positive verification for verifying the ability to detect a high level of a material in a tank comprising:
   a housing having an electromagnetic signal emitter emitting an electromagnetic signal in the direction of the material and an electromagnetic signal receiver receiving electromagnetic signals reflected from the material;
   a mount to support the housing;
   a movable shaft passing through the mount; and
   an electromagnetic signal target coupled to the movable shaft and remotely moveable from a first position not between the electromagnetic signal emitter and the material, to a second position between the electromagnetic signal emitter and the material to reflect the electromagnetic signal to the detector at approximately the same intensity that the material reaching the high level would reflect.

7. The level detector of claim 6 wherein the moveable shaft comprises a first shaft portion inside the tank coupled to the target and a second shaft portion outside the tank coupled to an indicator of the target position.

8. The level detector of claim 7 adapted to be mounted on a nozzle flange of a tank such that the emitter is substantially centered in the nozzle flange and the moveable shaft is not centered.

9. The level detector of claim 8 with the length of the first shaft portion and the properties of the target adapted to reflect the emitted electromagnetic signal at a magnitude substantially the same as would be reflected by the material reaching a predetermined height in the tank when the target is in the second position.

10. A method of verifying that a high level alarm based on electromagnetic energy reflected from a material in a tank will be triggered when the material reaches a high level corresponding to the high level alarm, comprising:
   determining a level of the material in the tank by emitting electromagnetic energy towards a surface of the material and measuring the reflected electromagnetic energy received at a detector;
   positioning a remotely positionable target-between the emitter of the electromagnetic energy and the material so that the target reflects electromagnetic energy to the detector at approximately the same intensity that the material reaching the high level would reflect; and confirming the high level alarm is triggered.

11. The method of claim 10 further comprising recalibrating a trigger based on a detector output produced when the target is remotely positioned to reflect the electromagnetic energy.

12. A safety level limit verifier for verifying a safety limit in a tank containing a material comprising:

a movable rod having a proximal end outside the tank and a distal end inside the tank;

a target adapted to reflect electromagnetic waves at approximately the same intensity that the material reaching the safety level limit would reflect coupled to the distal end; and a mountplate holding a radar level gage and a coupling sized to seal with the movable rod and to allow the movable rod to do at least one of rotating or sliding.

* * * * *